United States Patent
Bijlsma et al.

(10) Patent No.: US 12,502,426 B2
(45) Date of Patent: Dec. 23, 2025

(54) INACTIVATED PISCINE ORTHOREOVIRUS VACCINE

(71) Applicant: Intervet Inc., Madison, NJ (US)

(72) Inventors: Johanna Jacoba Elisabeth Bijlsma, Nijmegen (NL); Sven Leininger, Bergen (NO); Stephane Villoing, Bergen (NO)

(73) Assignee: Intervet Inc., Rahway, NJ (US)

( * ) Notice: Subject to any disclaimer, the term of this patent is extended or adjusted under 35 U.S.C. 154(b) by 836 days.

(21) Appl. No.: 17/783,478

(22) PCT Filed: Dec. 15, 2020

(86) PCT No.: PCT/EP2020/086086
§ 371 (c)(1),
(2) Date: Jun. 8, 2022

(87) PCT Pub. No.: WO2021/122507
PCT Pub. Date: Jun. 24, 2021

(65) Prior Publication Data
US 2023/0105140 A1    Apr. 6, 2023

(30) Foreign Application Priority Data
Dec. 16, 2019  (EP) .................................... 19216504

(51) Int. Cl.
*A61K 39/15*     (2006.01)
*A61K 47/22*     (2006.01)
*A61K 39/00*     (2006.01)

(52) U.S. Cl.
CPC ............. *A61K 39/15* (2013.01); *A61K 47/22* (2013.01); *A61K 2039/552* (2013.01)

(58) Field of Classification Search
None
See application file for complete search history.

(56) References Cited

FOREIGN PATENT DOCUMENTS

| CA | 2988038 A1 | 6/2019 |
|---|---|---|
| JP | 2017029102 A | 2/2017 |
| RU | 2401665 C2 | 10/2010 |
| RU | 2491339 C2 | 8/2013 |
| RU | 2633058 C2 | 10/2017 |
| WO | 9845415 A1 | 10/1998 |
| WO | 98/51660 A1 | 11/1998 |
| WO | WO 2005039501 A2 | 5/2005 |
| WO | WO 2005039501 A3 | 5/2005 |
| WO | WO 2005040353 A2 | 5/2005 |
| WO | WO 2005040353 A3 | 5/2005 |
| WO | 2005121325 A1 | 12/2005 |
| WO | WO 2008076371 A2 | 6/2008 |
| WO | WO 2008076371 A3 | 6/2008 |
| WO | 2011041789 A1 | 4/2011 |
| WO | WO 2012018973 A1 | 2/2012 |
| WO | 2015028565 A1 | 3/2015 |
| WO | 2015185605 A1 | 12/2015 |
| WO | 2016075277 A1 | 5/2016 |
| WO | WO 2018140766 A2 | 8/2018 |
| WO | WO 2018140766 A3 | 8/2018 |

OTHER PUBLICATIONS

Efimova et al. (Russian Agricultural Sciences. 2014; vol. 40 (No. 2): pp. 153-156).*
El-Khair et al. (Egyptian Journal of Agricultural Research. Sep. 1, 2004; 82 (3): 1429-1437).*
Wu, Yung Fu et al., Characterization of interleukin-1beta mRNA expression in chicken macrophages in response to avian reovirus, Journal of General Virology, 89, 1059-1068, 2008.
Bahnemann, H.G., Inactivation of viral antigens for vaccine preparation with particular reference to the application of binary ethylenimine, Vaccine, 1990, pp. 299-303, vol. 8.
Bjorgen, Havard et al., Piscine orthoreovirus (PRV) in red and melanised foci in white muscle of Atlantic salmon (*Salmo salar*), Veterinary Research, 2015, 1-12, 46(89).
Chen, Weisan et al., Modification of Cysteine Residues In Vitro and In Vivo Affects the Immunogenicity and Antigenicity of Major Histocompatibility Complex Class I-restricted Viral Determinants, The Journal of Experimental Medicine, 1999, 1757-1764, 189(11).
Delrue, Iris et al., Inactivated virus vaccines from chemistry to prophylaxis: merits, risks and challenges, Expert Review of Vaccines, 2012, 695-719, 11(6).
James, Kevin T., Novel High-throughput Approach for Purification of Infectious Virions, Scientific Reports, 2016, 1-11, 6.
Kibenge, F.Sb., Emerging viruses in aquaculture, Current opinion in Virology, 2019, pp. 97-103, 34.
Markussen, T. et al., Sequence Analysis of the Genome of Piscine Orthoreovirus (PRV) Associated with Heart and Skeletal Muscle Inflammation (HSMI) in Atlantic Salmon (*Salmo salar*), PLOS One, 2013, e70075, 8(7).
Palacios, G. et al., Heart and Skeletal Muscle Inflammation of Farmed Salmon is Associated with Infection with a Novel Reovirus, PLOS One, 2010, e11487, 5(7).
Wessel, O. et al., Inactivated Piscine orthoreovirus vaccine against heart and skeletal muscle inflammation in Atlantic salmon, Journal of Fish Diseases, 2018, pp. 1411-1419, 41.
Wessel, O. et al., Infection with purified Piscine orthoreovirus demonstrates a causal relationship with heart and skeletal muscle inflammation in Atlantic salmon, PLOS One, 2017, e0183781, 12(8).

(Continued)

*Primary Examiner* — Shanon A. Foley
(74) *Attorney, Agent, or Firm* — Susanna C. Benn

(57) ABSTRACT

The invention derives from the discovery that the immunogenicity of piscine orthoreovirus (PRV) can be significantly increased by inactivating the virus in a way different from the prior art: by incubation with an aziridine the vaccine potency against challenge infection by cohabitation is much improved over prior art approaches. This allowed the development of an effective inactivated vaccine against infection and disease caused by PRV.

17 Claims, No Drawings
Specification includes a Sequence Listing.

(56) References Cited

OTHER PUBLICATIONS

Wessel, O., et al., Antiviral Responses and Biological Consequences of Piscine orthoreovirus Infection in Salmonid Erythrocytes, Frontiers in Immunology—Mini review, 2019, Article 3182, vol. 9.

* cited by examiner

INACTIVATED PISCINE ORTHOREOVIRUS VACCINE

CROSS-REFERENCE TO RELATED APPLICATIONS

This application is a National Stage application of International Patent Application No. PCT/EP2020/086086, filed Dec. 15, 2020, which claims priority to European Patent Application No. 19216504.1, filed Dec. 16, 2019.

REFERENCE TO SEQUENCE LISTING SUBMITTED ELECTRONICALLY

The contents of the electronic sequence listing (24910.txt; Size: 1,156 bytes; and Date of Creation: Jun. 8, 2022) are herein incorporated by reference in their entirety.

The present invention relates to the field of veterinary vaccines; more specifically the invention relates to a composition and to vaccines comprising inactivated piscine orthoreovirus (PRV), to methods for producing said composition or said vaccine, and to use of said composition and of the vaccine for the protection of fish against infection or disease caused by PRV.

Aquaculture of fish and shrimp has become an important means to produce animal protein for food and feed. Of these, the aquaculture of Salmonid fish, especially of Atlantic salmon, has the highest value and is the most industrialised type of fish farming. Large producers of farmed Atlantic salmon are in cold seawater areas of Norway, Chili, Canada, Scotland, and Iceland. The close proximity of large numbers of animals, and their exposure to the natural environment, makes such cultures sensitive to outbreaks of diseases. These cause significant discomfort to the animals, as well as economic losses for their farmers. Many vaccines are available for use in aquaculture, however new pathogens regularly appear.

Piscine orthoreovirus (PRV) was identified in 2010 (Palacios et al., 2010, PloS one, vol. 5, e11487) as the causative agent of different diseases in Salmonid fish such as salmon and trout, e.g.: heart and skeletal muscle inflammation (HSMI), anaemia, idiopathic syndrome of rainbow trout (ISRT), and erythrocyte inclusion body syndrome (EIBS). In all cases erythrocytes, which are nucleated in fish, are the initial target cells for PRV. Viral subtypes of PRV have been described which show a preference and differential pathogenicity for different types of Salmonids (Wessel et al., 2019, Frontiers in Immunology, vol. 9, article 2018.3182).

Reoviruses have a segmented genome of double stranded RNA. The virion particle is non-enveloped, but has a double capsid structure. Details of the viral genome of PRV were published in 2013 (Murkussen et al., 2013, PloS one, vol. 8, e70075), and the virus was classified as an Orthoreovirus because it has 10 genome segments, and was non-fusogenic.

However, amino acid identity to other Orthoreovirideae is relatively low, and PRV has conserved elements resembling the Aquareovirideae. The study of PRV is hampered by a failure to grow the virus consistently in vitro. Additionally, its role in disease was initially uncertain because the virus is also common in healthy and convalescent fish (Wessel et al., 2017, PloS one, vol. 12, e0183781).

Several attempts have been described to develop a vaccine against PRV infection and disease, by testing inactivated-, DNA-, or subunit type vaccines.

WO 2005/121325, WO 2015/028565 and CA 2.988.038 describe a method of culturing PRV on fish cells, and suggest a vaccine could be prepared by virus inactivation (no inactivation method preferred). However no actual vaccines were made or tested. The same applies to WO 2011/041789 and JP2017029102 which broadly describe a multitude of possibilities for PRV vaccines, but did not actually make or test any vaccine.

WO 2015/185605 and WO 2016/075277 describe PRV strains isolated from trout, diagnostic methods for detection, and potential (but no actual) vaccines.

WO 2019/110664 describes PRV subunit vaccines based on viral proteins, specifically on PRV non-structural proteins.

A vaccine based on inactivated whole virus is described in Wessel et al. 2018 (J. of Fish Diseases, vol. 41, p. 1411-1419). The authors employ formaldehyde for the inactivation of PRV. The vaccine was adjuvated with a mineral oil, and formulated as a water-in-oil emulsion. While the protection levels were fair for injection-challenged fish, however the fish challenged by cohabitation with PRV infected fish, hardly showed any protection at all. As the cohabitation challenge is the closest thing to the natural way of PRV transmission and -infection in the field, this cannot be considered as an effective vaccine.

This explains why until today no PRV vaccine is commercially available. As a result, there is a need in the field for an effective PRV vaccine.

It is therefore an object of the present invention to overcome a disadvantage in the prior art, and to accommodate to this need in the field by providing an effective inactivated PRV vaccine.

A wide variety of methods is known to inactivate a virus for the preparation of an inactivated virus vaccine. Such methods typically aim to damage the structure, the proteins, or the nucleic acids of a virus, to render it non-infectious or non-proliferative. The methods employ chemical- or physical inactivation. Examples of physical inactivation are: heating, high shear, high pressure, or exposure to ionising radiation, e.g. UV light, X-rays or gamma rays. Examples of chemical inactivation are exposure to high- or low pH, or addition of an enzyme, a detergent, an organic solvent, a chaotropic agent, formaldehyde, a lactone or an aziridine.

Aziridines are organo-chemical compounds comprising an aziridine ring. These compounds are used in human medicine as anti-cancer agents for their tendency to damage nucleic acids by an alkylation reaction, causing cross-linking and strand breaks. In biotechnology this property of aziridines is used for the inactivation of micro-organisms such as viruses.

A well-known aziridine used for the inactivation of viruses is ethylenimine (EI), mostly used in the form of binary ethylenimine (BEI). This is reviewed by H. Bahnemann (1990, Vaccine, vol. 8, p. 299-303).

In comparison to inactivation with other chemicals such as formalin, EI more selectively reacts with nucleic acids. However some reaction with protein has also been described, namely by the alkylation of the sulfhydryl group of a cysteine amino acid into an allylene-thioether. This may have negative effects on immunogenicity: Chen et al. (1999, J. of Exp. Med., vol. 189, p. 1757-1764) describe loss of antigenicity by the S-alkylation of cysteines in proteins. This is also why several papers recommend precautions to reduce the effect of aziridines on proteins during inactivation reactions: WO 98/51660 describes the development of polymers of EI which are more specific for nucleic acids. Also, WO 98/45415 describes inactivation with EI at an acid pH level to reduce reaction with viral proteins.

Consequently, the use of an aziridine for the inactivation of a virus has well-known potential downsides.

Surprisingly it was found that the object of the invention can be met, and consequently one or more disadvantages of the prior art can be overcome, by providing a vaccine based on PRV that had been inactivated by an alternative method.

When the inventors studied the results of prior art inactivated PRV vaccines, they realised that the immunological efficacy of a vaccine based on formalin-inactivated PRV, e.g. as described in Wessel et al. 2018 (supra), is insufficient to support the development of an effective commercial vaccine product. They subsequently considered other ways to manufacture a PRV vaccine. One approach was the inactivation of the viral nucleic acids by irradiation by UV-light. However, a vaccine prepared from UV-inactivated PRV could not protect Salmonid fish against HSMI resulting from a PRV cohabitation challenge infection, in fact it was hardly any better than the negative control vaccination.

Without indication in the prior art, they then discovered that the immunological potency of a composition comprising inactivated PRV could be increased considerably by employing a different method for the inactivation of that PRV, namely by incubation with an aziridine. Unexpectedly this did not damage the immunogenicity of PRV antigens, but rather produced an inactivated PRV antigen that when used in a vaccine could strongly reduce signs of HSMI disease, even against challenge-infection by way of cohabitation.

This was not at all obvious from any disclosure in the prior art: it could not be predicted that one method of viral inactivation (aziridine) would produce PRV antigens that are significantly more potent than by the use of other methods (formaldehyde, UV-light). On the contrary, aziridine incubation is often counter-indicated in the prior art for the damage it causes to protein immunogenicity.

It is not known exactly how or why aziridine-inactivated PRV is more potent in inducing a protective immune response against a PRV infection in Salmonid fish than PRV treated by alternative methods of viral inactivation.

Although the inventors do not want to be bound by any theory or model that might explain these findings, they suggest that this advantageous result may be caused by the combined effects of aziridine incubation: both the alkylation of nucleic acids as well as some level of alkylation of one or more viral proteins. In one way or other this may generate, develop, or expose antigens that can induce a stronger or more effective activation of the fish immune-response against PRV infection and disease.

Therefore in one aspect the invention relates to a composition comprising inactivated orthoreovirus, characterised in that the orthoreovirus had been inactivated by incubation with an aziridine.

In an embodiment of the composition comprising inactivated orthoreovirus according to the invention, the orthoreovirus is piscine orthoreovirus (PRV).

The "composition" for the invention will typically derive from an aqueous liquid, such as water, a buffer or a culture medium. The composition will commonly be composed of pharmaceutically acceptable ingredients, and be of physiological composition. The composition may comprise further excipients such as stabilisers and preservatives.

Included in the definition of composition are both the liquid and the solid forms of the composition according to the invention; examples of the solid form are situations wherein the composition is frozen or freeze-dried.

The term "comprising" (as well as variations such as "comprise", "comprises", and "comprised") as used herein, refer(s) to all elements, and in any possible combination conceivable for the invention, that are covered by or included in the text section, paragraph, claim, etc., in which this term is used, even if such elements or combinations are not explicitly recited; and does not refer to the exclusion of any of such element(s) or combinations. Consequently, any such text section, paragraph, claim, etc., can also relate to one or more embodiment(s) wherein the term "comprises" (or its variations) is replaced by terms such as "consist of", "consisting of", or "consist essentially of".

The composition according to the invention can comprise PRV from different origins and in different ways: the PRV can be produced in vitro, such as in a cell-culture system, and the composition can be the whole culture, or a part thereof such as the supernatant or the pellet, or a filtrate or retentate. Alternatively, the PRV can be produced in vivo, e.g. in a fish kept in containment, and the composition can comprise PRV-containing fluids, cells and/or tissues from the fish such as blood, spleen, head-kidney or muscle; the composition can be a preparation from such cells or tissues, such as an extract, sonicate or lysate, or can be a (semi-) purified version of such preparation, such as by chromatography, filtration or centrifugation.

A virus is "inactivated" for the invention when it can no longer infect and/or replicate in host cells or in a target animal, while such host cells or target animal would normally be suitable to allow a 'life' (i.e. non-inactivated) virus to proliferate.

Whether a PRV has indeed been inactivated can readily be detected using common techniques. One way is to test on one of the published cell-lines that allow growth of PRV for some rounds. Signs of infection can then be observed based on cytopathogenic effect by microscopic inspection or based on detection of viral replication by e.g. RT-qPCR (reverse transcriptase quantitative real-time PCR), ELISA, immunofluorescence, or flow cytometry.

Alternatively such an inactivation-control test can be performed in vivo by inoculation of Salmonid fish, including appropriate positive- and negative controls, and detection of any PRV infection by histo-pathologic screening at 2-8 weeks after inoculation, and/or by RT-qPCR or immunostaining at 2 weeks p.i.

A "piscine orthoreovirus" refers to a species of virus in the taxonomic genus Orthoreovirus, in the family of Reoviridae. Such a virus has the characterising features of its taxonomic group, such as the morphologic, genomic, and biochemical characteristics, as well as the biological characteristics such as physiologic, immunologic, or pathologic behaviour. Several subtypes of PRV are known, which can infect a variety of bony fin-fish, specifically Salmonid fish. A description of the characteristics and the effects of PRV in aquaculture is presented in Wessel et al., 2019 (supra), and Kibenge, 2019 (Current Opinion in Virology, vol. 34, p. 97-103). Kibenge also proposes to change the classification of PRV into two genotypes and 4 subgenotypes.

As is known in the field, the classification of a micro-organism in a particular taxonomic group is based on a combination of its features. The invention therefore also includes variants in the PRV species that are sub-classified therefrom in any way, for instance as a subspecies, strain, isolate, genotype, variant, subtype or subgroup, and the like.

Further, it will be apparent to a person skilled in the field of the invention that while a particular PRV for the invention may currently be assigned to this species, however that is a taxonomic classification that could change in time as new insights can lead to reclassification into a new or different taxonomic group. However, as this does not change the virus itself, or its antigenic repertoire, but only it's scientific name or classification, such re-classified viruses remain within the scope of the invention.

Samples of PRV for use in the invention can be obtained from a variety of sources, e.g. as field isolate from a fish in the wild or from aquaculture, or from various laboratories, (depository) institutions, or (veterinary) universities. Also, much genetic information on PRV is available digitally in public sequence databases such as NCBI's GenBank and EMBL's EBI.

For the invention a "Salmonid" is a bony fin fish of the family Salmonidae. This family comprises fish such as salmon, trout, char, freshwater whitefish and graylings; for example: from the genus *Salmo*: Atlantic salmon (*Salmo salar* L.), Adriatic trout (*Salmo obtusirostris*), Flathead trout (*Salmo platycephalus*), Marble trout (*Salmo marmoratus*), Ohrid trout (*Salmo letnica*), Sevan trout (*Salmo ischchan*), and Brown trout (*Salmo trutta*); from the genus *Salvelinus*: Arctic char (*Salvelinus alpinus*); and from the genus *Oncorhynchus*: rainbow trout (*Oncorhynchus mykiss*), Coho salmon (*Oncorhynchus kisutch*) and Chinook salmon (*Oncorhynchus tshawytscha*).

An "aziridine" is an organo-chemical compound containing an aziridine ring, and has the structural formula (1):

$$\underset{\triangle}{\overset{R_1}{\underset{|}{N}}} \tag{1}$$

The aziridine ring is a three membered heterocycle consisting of one amine- and two methylene groups. The ring is very reactive, and can open up by reaction of one of the methylenes with a nucleophilic group. For a protein such reaction typically results in the alkylation of the sulfhydryl group of a cysteine, or of the thioether of a methionine amino acid.

The R1 side-group in formula (1) is H, or is an alkyl such as an alkenyl, alkinyl, alkaryl, aralkyl, or a cycloalkyl.

Much used aziridines for the inactivation of viruses are ethylenimine (R1=H) and N-acetyl-ethylenimine (R1=ethanone).

NB: Aziridines are toxic and mutagenic chemicals which must be stored, handled, and discarded in a safe and compliant manner. Aziridines can be neutralised by incubation with a thiosulfate, for example sodium thiosulfate ($Na_2S_2O_3$).

The inactivation of a PRV by "incubation with an aziridine" for the invention, regards the incubation of a composition comprising a PRV with an aziridine, under such conditions and during sufficient time for the PRV to become inactivated. Such incubation can be performed with a wide variety of conditions and parameters, all well known to the person skilled in the field of the invention, and readily available for optimisation and adaptation by routine methods when required.

Whether a virus sample has been 'inactivated by incubation with an aziridine', as opposed to inactivation with another agent or method, can be detected using standard methods and technology by detecting the specific effects induced by an aziridine incubation, such as the cross-linking and breakage of the nucleic acid which can be detected by gel electrophoresis and appropriate staining. Similarly, the alkylation of amino acids can be detected by mass-spectrometry or HPLC. Of course the use of aziridine incubation as for the present invention will also be recognisable from the high immunologic potency of a PRV sample of unknown history, as compared to a PRV sample of similar antigenic mass that was not incubated with an aziridine Details of embodiments and of further aspects of the invention will be described below.

As described, PRV exists in different variants, which were initially named as subtypes 1, 2 and 3. Recently Kibenge (2019, supra) proposed a different naming and subdivision as genotypes I and II, and subgenotypes Ia, Ib, IIa, and IIb. The PRV of subtype 1 and of genotype I is mostly found in Atlantic salmon, and the PRV of subtypes 2 and 3, and of genotype II is mostly found in Coho salmon and in various trout species.

The present invention as described herein is equally effective using any type, subtype or variant of PRV. Therefore, in an embodiment of the composition according to the invention, the PRV is one or more selected from subtype PRV-1, PRV-2, and PRV-3.

Preferably the PRV is of subtype PRV-1

Alternatively, when employing the novel classification for PRV: in an embodiment of the composition according to the invention, the PRV is one or more selected from genotype I and genotype II.

Preferably the PRV is of genotype I.

In an embodiment of the composition according to the invention, the aziridine is one or more selected from: ethylenimine, 2-ethyl-ethylenimine, 1-acetyl-ethylenimine, 2-methyl-ethylenimine, 1-ethylenimine-ethanol, and 2-isobutyl-ethylenimine. More preferred, the aziridine is ethylenimine.

In a preferred embodiment of the aziridine, one or more of the conditions applies selected from:
  ethylenimine is preferably CAS nr. 151-56-4,
  2-ethyl-ethylenimine is preferably CAS nr. 2549-67-9,
  1-acetyl-ethylenimine is preferably CAS nr. 460-07-1,
  2-methyl-ethylenimine is preferably CAS nr. 75-55-8,
  1-ethylenimine-ethanol is preferably CAS nr. 1072-52-2, and
  2-isobutyl-ethylenimine is preferably CAS nr. 3647-37-8.

Preparation of the composition with the PRV according to the invention, and inactivation of the PRV by incubation with an aziridine can be applied using routine methods and materials, readily available to the skilled person.

Therefore a further aspect of the invention regards a method for the production of a composition comprising aziridine-inactivated PRV, the method comprising the steps of:
  a. obtaining a composition comprising PRV, and
  b. inactivating the PRV in said composition by incubation with an aziridine.

As described above, there are many ways for "obtaining a composition comprising PRV". These depend on the way the virus was amplified and harvested, and can relate e.g. to amplification of the virus in vitro, such as in a cell-culture. Alternatively the PRV can be amplified in vivo e.g. by infection of fish and harvesting tissues and/or organs of those fish. These harvests can be purified partially or extensively, and may be stored cooled or frozen until further use in the method for the production according to the invention.

After obtaining the PRV, next step in the method for the production according to the invention, is the inactivation of the PRV in the obtained composition comprising PRV, specifically by incubation with an aziridine. This incubation with an aziridine can be performed with a wide variety of conditions and parameters, all well known to the person skilled in the field of the invention, and readily available for optimisation and adaptation by routine methods when required.

For example said incubation can be performed at a wide range of temperatures.

In an embodiment of the method for the production according to the invention, the incubation with an aziridine is performed at a temperature above zero degrees Celsius.

More preferably at a temperature between 1 and 55° C., between 5 and 50° C., between 1° and 40° C., or even between 15 and 40° C., in this order of preference.

Similarly, in the method for the production according to the invention, the incubation with an aziridine can be performed at a wide variety of pH values.

In an embodiment of the method for the production according to the invention, the incubation with an aziridine is performed at a pH of 4 or above.

More preferably the incubation with an aziridine is performed at a pH above 4.5, 5, 5.5, 6, 6.5, 7, or even at a pH above 7.5, in this order of preference.

The upper limit of the pH value for the incubation with an aziridine in the method for the production according to the invention, is readily determined in relation to the other parameters of the incubation.

Preferably the incubation with an aziridine is performed at a pH below 12, below 10, or even below 9, in this order of preference.

As the skilled person will appreciate, because the aziridine gets consumed by the alkylation reaction during the inactivation, its concentration can only be indicated with certainty at the start of the incubation.

Therefore, in an embodiment of the method for the production according to the invention, the concentration of the aziridine at the start of the incubation is at least 0.1 milliMolar.

More preferably the concentration of the aziridine at the start of the incubation is at least 0.2, 0.3, 0.5, 1.0, 1.5, 2.0, 2.5, 3.0, 3.5, 4.0, 4.5, 5, 6, 7, 8, 9, 10, 11, 12, 13, 15, 20, 30, 40, or even at least 50 milliMolar, in this order of preference.

The upper limit for the concentration of the aziridine at the start of the incubation can readily be determined. Preferably the concentration of the aziridine at the start of the incubation is below 1 Molar, below 0.5 Molar, or even below 0.1 Molar, in this order of preference.

In an embodiment of the method for the production according to the invention, the duration of the incubation of the composition comprising the PRV with the aziridine, is at least 10 minutes.

More preferably the duration of the incubation of the composition comprising the PRV and the aziridine, is at least 20, 30, 40, 50, 60 minutes, 90 minutes, 2 hours, 3, 4, 5, 6, 8, 10, 12, 15, 24, or 36 hours, or even overnight (i.e. between 12 and 18 hours), in this order of preference.

In an embodiment of the method for the production according to the invention, the method comprises an additional step to be performed after the incubation with an aziridine, which additional step provides for the neutralisation of any aziridine remaining after the incubation reaction.

In a preferred embodiment, the neutralisation step is performed by the addition to the incubation-mixture after the incubation reaction, of an appropriate amount of a thiosulphate, and incubation for an appropriate length of time to complete the neutralisation. For example: neutralisation by the addition of between 10 and 100 mM sodium-thiosulphate, and incubation for between 15 and 90 minutes, at between 15 and 30° C.

Because an aziridine is such a dangerous chemical, it is preferably used in the method for the production according to the invention, in a diluted form.

When the aziridine is ethylenimine this can conveniently be achieved by employing so-called 'binary ethylenimine' (BEI). BEI is the reaction product of the cyclization-reaction of bromoethylamine-hydrobromide (BEA) in alkaline conditions and under mild heating, e.g. to about 37° C. The alkaline conditions can conveniently be provided by the addition of e.g. sodium-hydroxide. All this is well-known in this field, see e.g. Bahnemann, 1990 (supra).

Therefore, in a preferred embodiment of the method for the production according to the invention, the aziridine is ethylenimine or binary ethylenimine.

In an embodiment of the method for the production according to the invention, the method comprises an additional step that is performed before the incubation with an aziridine, and in which additional step BEI is generated. Preferably the BEI is generated from the reaction of BEA with a hydroxide.

Next an appropriate amount of the generated BEI is then used as the aziridine for the incubation with the composition comprising the PRV.

In a further aspect the invention regards a composition comprising aziridine-inactivated PRV, characterised in that said composition is obtainable by the method according to the invention for the production of such a composition.

As described, PRV that had been inactivated with an aziridine was found to be a considerably more effective immunogen against PRV infection and disease, as compared to PRV inactivated in another way. Consequently, aziridine-inactivated PRV is ideally suited for use as a vaccine against infection and/or disease caused by PRV infection.

Therefore in a further aspect the invention regards the composition according to the invention, or the composition as obtainable by the method for the production according to the invention, for use in a vaccine for the protection of fish against infection or disease caused by PRV.

In a further aspect the invention regards a vaccine for fish against infection or disease caused by PRV, said vaccine comprising the composition according to the invention, or the composition as obtainable by the method for the production according to the invention, and a pharmaceutically acceptable carrier.

The "infection and disease caused by PRV" regards the infection by PRV of Salmonid fish, and the well-known subsequent pathological symptoms and effects, such as e.g. described for HSMI, anaemia, ISRT, and EIBS.

The "protection" regards reducing the viral load or shortening the duration of the replication of a PRV upon infection of a vaccinated fish. In turn this leads to a reduction of the number, the intensity, or the severity of lesions, associated symptoms, and clinical signs of disease caused by PRV infection.

The result of this protection is a restoration of the health of the vaccinated fish, which in turn leads to increased economic performance of vaccinated fish. This is reflected in one or more parameters such as: reduced mortality, better average daily weight gain, improved feed conversion, reduced costs of healthcare, etc.

One of the symptoms of disease caused by PRV infection, is the formation of melanin spots in the muscle of Atlantic Salmon. These black spots cause a devaluation of filet quality, and are thus a significant economic damage (Bjørgen et al., 2015, Vet. Res., vol. 46, p. 89). A vaccine according to the invention is helpful in reducing, or even preventing the formation of such melanized spots.

In addition to reduction of symptoms of disease, the protection regards a reduction of the chance of infection with PRV. This results from the reduction of the shedding after PRV infection by vaccinated fish into the environment, e.g. to other fish or within a geographical area. Consequently, the protection of the invention can also lead to a reduction of the prevalence of PRV.

A "vaccine" is well known to be a composition comprising an immunogen and a pharmaceutically acceptable carrier. The immunogen causes an immunological response in the vaccinated target, which response is effective in protecting against a disease or against an infection or its consequences.

The fish to be protected by the invention are preferably Salmonids.

Therefore, in embodiments of the composition for use as a vaccine according to the invention, and of the vaccine according to the invention, the vaccine is for Salmonid fish.

More preferably, the Salmonid fish is selected from salmon, trout, char, freshwater whitefish and graylings; still more preferably the Salmonid fish is selected from salmon and trout; still even more preferably the salmon is selected from Atlantic-, steelhead-, chinook-, coho-, pink-, chum-, and sockeye salmon; and the trout is selected from rainbow-, brook-, lake-, and brown trout; yet even more preferably the Salmonid fish is from the genus *Salmo*.

A "pharmaceutically acceptable carrier" assists in the manufacture, administration, and/or conservation of a vaccine, without causing (severe) adverse effects. Such a carrier can be an aqueous solution, for example water, a buffer, a physiological salt solution, or a culture medium.

A preferred pharmaceutically acceptable carrier for the vaccine according to the invention is a buffer such as phosphate-buffered saline (PBS), or a 'virus dilution buffer' e.g. as described by James et al., 2016 (Sci. Rep. 6, 36826; doi: 10.1038/srep36826), having 150 mM NaCl, 15 mM $MgCl_2$, and 10 mM Tris, at pH 8.2.

In addition the pharmaceutically acceptable carrier can comprise further additives and excipients, such as a stabiliser, or a preservative. Details and examples are well-known, for instance as described in handbooks such as: "Remington: the science and practice of pharmacy" (2000, Lippincott, USA, ISBN: 683306472), and: "Veterinary vaccinology" (P. Pastoret et al. ed., 1997, Elsevier, Amsterdam, ISBN 0444819681).

In addition, the vaccine according to the invention may comprise an adjuvant. For inactivated viral vaccines, an adjuvant can increase the target's immune response against the viral antigen.

Therefore in embodiments of the composition for use as a vaccine according to the invention, and of the vaccine according to the invention, the vaccine is characterised in that it comprises an adjuvant.

An "adjuvant" is a well-known vaccine ingredient that stimulates the immune response of a target in a non-specific manner. Many different adjuvants are known in the art. Examples of adjuvants are: complete- or incomplete Freund's adjuvant, vitamin E or alpha-tocopherol, non-ionic block polymers and polyamines such as dextran sulphate, CARBOPOL™, pyran, Saponin, such as: QUILA™, or Q-vac™. Saponin and vaccine components may be combined in an ISCOM™. Furthermore, peptides such as muramyl dipeptides, dimethylglycine, and tuftsin. Also, aluminium salts, such as aluminium-phosphate or an aluminium-hydroxide which is available for example as: ALHYDROGEL™ (Brenntag Biosector), REHYDRAGEL™ (Reheis), and REHSORPTAR™ (Armour Pharmaceutical).

An often used adjuvant is an oil, e.g. a mineral oil such as a light (white) mineral (paraffin) oil; or a non-mineral oil such as: squalene; squalane; vegetable oils or derivatives thereof, e.g. ethyl-oleate. Also combination products such as ISA™ (Seppic), or DILUVAC-FORTE™ and XSOLVE™ (both MSD Animal Health) can advantageously be used.

A handbook on adjuvants and their uses and effects is: "Vaccine adjuvants" (Methods in molecular medicine, vol. 42, D. O'Hagan ed., 2000, Humana press, NJ, ISBN: 0896037355).

The adjuvant can be combined with the composition for use according to the invention, or can be comprised in the vaccine according to the invention, in several ways. When the adjuvant comprises an oil, the composition according to the invention can be provided in aqueous form, and can be formulated as an emulsion with the oil, in different ways: as a water-in-oil (W/O), an oil-in-water (O/W), or as a double emulsion, either W/O/W or O/W/O.

An "emulsion" is a mixture of at least two immiscible liquids, whereby one is dispersed in another. Typically the droplets of the dispersed phase are very small, in the range of micrometres or less.

Procedures and equipment for the preparation of an emulsion at any scale are well-known in the art. To stabilise an emulsion, one or more emulsifiers can be used.

An "emulsifier" is a molecule with amphiphilic properties, having both a hydrophobic- and a hydrophilic side. Many emulsifiers are known in the art with their various properties. Most are readily available commercially, and in different degrees of purity. Common emulsifiers for vaccines are sorbitan monooleate (SPAN® 80) and polyoxyethylene-sorbitan-monooleate (polysorbate 80, or TWEEN® 80).

Especially advantageous as emulsifier for a Salmonid vaccine, are the emulsifiers as described in PCT/EP2019/077851.

Common emulsion-stabilisers are benzyl alcohol, and triethanolamine.

A well-known way to characterise the properties of (mixtures of) emulsifiers is the HLB number (hydrophile-lipophile balance; Griffin 1949, J. Soc. Cosm. Chem., vol. 1, p. 311-326). Typically an emulsifier or emulsifier mixture with HLB number below 10 favours W/O emulsions, while an emulsifier (mixture) with HLB number of 10-16 will favour O/W emulsions.

In a preferred embodiment of the vaccine according to the invention comprising an adjuvant, the adjuvant is an oil. More preferably the oil is a mineral oil. Even more preferred the mineral oil is a light (or white) liquid paraffin oil, examples are: DRAKEOL® 6VR (Penreco), MARCOL® 52 (Exxon Mobile), and KLEAROL® (Sonneborn).

In a preferred embodiment, the vaccine according to the invention comprises an oil as adjuvant, and is formulated as a water-in-oil emulsion.

When the composition according to the invention is in solid form, this can be combined with an adjuvant such as an oil, as a suspension, e.g. by admixing the composition according to the invention in freeze-dried form with an oil adjuvant.

In the vaccine according to the invention, the aziridine-inactivated PRV is comprised in an amount that is immunologically effective. Determination of what is an 'immunologically effective' amount of the PRV in the vaccine according to the invention is well within the routine capabilities of the skilled artisan, and can for example be determined by monitoring the immunological response following vaccination and a challenge infection, e.g. by monitoring the targets' signs of disease, clinical scores, or by re-isolation of the pathogen, and comparing these results to a vaccination-challenge response seen in mock-vaccinated animals.

The amount of the aziridine-inactivated PRV for inclusion in the vaccine according to the invention can be indicated in different ways, for example by the viral titre of the PRV in the composition according to the invention before the inactivation reaction. Titration can e.g. be done by titration in fish, or on fish erythrocytes or a cell-line, and expression of the titre in ID50/ml.

PRV quantification can also be done by biochemical or molecular biological testing. For example by gel-electrophoresis and comparison to standard samples of known amounts of protein. Effective is also the use of RT-qPCR, to quantify the number of copies of one of the genes of PRV. This involves comparing the Cq (quantification cycle) value obtained for a PRV sample to the Cq value obtained from a PCR on a plasmid carrying a selected gene, e.g. the Sigma 1 gene. Because it is known exactly how much of the plasmid was added to the PCR reaction, and thus how many copies of the gene, this gives an indication of the PRV-genome copy numbers per unit of volume.

Further, PRV antigen can be quantified before or after the inactivation reaction by a serologic- or biochemical test such as an ELISA or an ALPHALISA™, and expressed in relative units, compared to an appropriate reference standard. When the vaccine is formulated as an emulsion, the amount of aziridine-inactivated PRV can be analysed in the ready vaccine emulsion, using standard biochemical laboratory procedures, for example by breaking the emulsion, and testing the water-phase using SDS-PAGE, Elisa, HPLC, or mass-spectrometry, all these are well known in the art. Determining amounts is then done by comparing to known amounts of a reference protein- or virus sample. See e.g.: The Protein Protocols Handbook, 2nd edition, September 2002, ed. J. M. Walker, Humana Press Inc., Totowa, NJ; Chapter 29, p. 237-242.

The vaccine according to the invention can be used as a prophylactic-, metaphylactic-, or therapeutic treatment.

The vaccine according to the invention can serve as an effective priming vaccination, which can later be followed and amplified by a booster vaccination, with the same or with a different vaccine.

For the vaccine according to the invention it can be advantageous to make further combinations with additional immunoactive components. This can serve to enhance the immune protection already provided, or to expand it to other pathogens.

Therefore, in an embodiment, the vaccine according to the invention comprises at least one additional immunoactive component.

Such an "additional immunoactive component" may be an antigen, an immune enhancing substance, an adjuvant or immunomodulator such as a cytokine or an immunostimulatory nucleic acid comprising an unmethylated CpG, a vaccine, or any combination thereof. This provides advantages in terms of cost, efficiency and target welfare. Alternatively, the vaccine according to the invention, may itself be added to a vaccine.

In a preferred embodiment, the additional antigen is a further pathogen of Salmonid fish, or is derived from such a further pathogen; more preferably the further pathogen is selected from: bacteria, viruses, algae, fungi, and endo- or ecto-parasites.

- Preferably, the bacterial pathogen is one or more selected from *Aeromonas salmonicida, Vibrio salmonicida, Vibrio anguillarum*, and *Moritella viscosa.*
- Preferably the further viral pathogen is one or more selected from salmon pancreas disease virus (SPDV), infectious pancreatic necrosis virus (IPNV), sleeping disease virus (SDV), viral haemorrhagic septicaemia virus (VHSV), infectious haematopoietic necrosis virus (IHNV), infectious salmon anaemia virus (ISA), and infectious pancreatic necrosis virus (IPNV).
- Preferably the parasitic pathogen is an ecto-parasite, preferably from the taxonomic family Caligidae; more preferably from the genera Lepeophtheirus or Caligus.

In an embodiment of the vaccine according to the invention, the additional vaccine is a combi vaccine for Salmonids, comprising several viral and/or bacterial antigens. Preferably the additional Salmonid combi vaccine is selected from FORTE® VII (Aqua Health, Novartis), ALPHA JECT® micro 6 (Pharmaq), AQUAVAC® PD3 or AQUAVAC® PD7 (MSD Animal health), and BLUEGUARD® IPN+SRS+As+Vo+ISA from Centrovet (Virbac).

In an embodiment of the vaccine according to the invention, one or more of the conditions apply, selected from the group consisting of:

- the vaccine is for Salmonid fish; more preferably the Salmonid fish is selected from salmon, trout, char, freshwater whitefish and graylings; still more preferably the Salmonid fish is selected from salmon and trout; still even more preferably the salmon is selected from Atlantic-, steelhead-, chinook-, coho-, pink-, chum-, and sockeye salmon; and the trout is selected from rainbow-, brook-, lake-, and brown trout; yet even more preferably the Salmonid fish is from the genus *Salmo;*
- the pharmaceutically acceptable carrier for the vaccine according to the invention is phosphate-buffered saline (PBS) or a virus dilution buffer;
- the vaccine comprises an adjuvant; preferably the adjuvant is an oil; more preferably the oil is a mineral oil; even more preferred the mineral oil is a light liquid paraffin oil;
- the vaccine according to the invention comprises an oil as adjuvant, and is formulated as a water-in-oil emulsion.
- the vaccine comprises at least one additional immunoactive component; preferably the additional antigen is a further Salmonid pathogen or is derived from such a further Salmonid pathogen; more preferably the further Salmonid pathogen is selected from: bacteria, viruses, algae, fungal, and endo- or ecto-parasites;
- the bacterial Salmonid pathogen is one or more selected from *Aeromonas salmonicida, Vibrio salmonicida, Vibrio anguillarum*, and *Moritella viscosa;*
- the further viral Salmonid pathogen is one or more selected from Salmon pancreas disease virus (SPDV) and Infectious pancreatic necrosis virus (IPNV);
- the parasitic Salmonid pathogen is an ecto-parasite, preferably from the taxonomic family Caligidae; more preferably from the genera Lepeophtheirus or Caligus; and
- the additional vaccine is combi vaccine for Salmonids, comprising several viral and/or bacterial antigens; preferably the additional Salmonid combi vaccine is selected from FORTE® VII (Aqua Health, Novartis), ALPHA JECT® micro 6 (Pharmaq), AQUAVAC®

PD3 or AQUAVAC® PD7 (MSD Animal health), and BLUEGUARD® IPN+SRS+As+Vo+ISA from Centrovet (Virbac).

In an embodiment of the vaccine according to the invention, the vaccine is for salmon or trout, and the vaccine is formulated as an emulsion with a mineral oil adjuvant that is a light liquid paraffin oil.

In order to induce its protective immunological effect, the composition for use according to the invention, and the vaccine according to the invention, need to be administered to a fish.

Therefore in a further aspect the invention regards a method for protecting a fish against infection or disease caused by PRV, the method comprising the administration to said fish of the vaccine according to the invention.

The "administration" of the vaccine according to the invention to a fish can be performed using any feasible method and route. Typically the optimal way of administration will be determined by the type of the vaccine applied, and the characteristics of the fish and of the disease caused by the pathogen that it is intended to protect against. Depending on how the vaccine according to the invention is formulated, different techniques of administration can be applied. For example when in the form of an O/W emulsion, the vaccine according to the invention can be administered e.g. by an enteral or mucosal route, i.e. by immersion. Other possibility is via a method of mass administration, such as via the feed.

Alternatively, when in the form of a W/O emulsion, the vaccine according to the invention is preferably administered by parenteral route.

In an embodiment of the method for protecting a fish according to the invention, the administration is by parenteral route.

"Parenteral" refers to administration through the skin, for example by intramuscular, intra-peritoneal, intradermal, submucosal, or subcutaneous route.

The preferred parenteral route is by intraperitoneal injection.

It goes without saying that the optimal route of administration of a vaccine according to the invention will depend on the specifics of the vaccine that is used, and on the particular characteristics of the fish. A skilled person is perfectly capable of selecting and optimising such route- and method of administration when desired.

The volume of a dose of the vaccine according to the invention, e.g. when administered by parenteral route, is a volume that is acceptable for the fish target, and can for instance be between about 0.001 and about 5 ml. Preferably one dose is a volume between 0.005 and 3 ml, between 0.01 and 1 ml, or even between 0.025 and 0.5 ml, in this order of preference.

The term "about" for the invention means ±25% around an indicated value, preferably "about" means ±20, 15, 12, 10, 8, 6, 5, 4, 3, 2% around an indicated value, or even "about" means ±1% around an indicated value, in that order of preference.

The targets for the vaccine according to the invention are Salmonid fish in need of a vaccination against infection or disease caused by PRV. The age, weight, sex, immunological status, and other parameters of the target fish to be vaccinated are not critical, although it is clearly favourable to vaccinate healthy, uninfected targets, and to vaccinate as early as possible.

The method, timing, and volume of the administration of a vaccine according to the invention can be adapted and optimised for the particular type of fish to be vaccinated, incorporating also the time and stage when the fish would be exposed to the pathogen.

For the method for protecting a fish according to the invention, and for the situation where the fish is an Atlantic salmon, the administration is preferably performed in the smolt stadium, shortly before the transfer to salt water.

The administration of a vaccine according to the invention is preferably integrated into existing vaccination schedules of other vaccines that the target fish may require, in order to reduce stress to the fish and to reduce labour costs. These other vaccines can be administered in a simultaneous, concurrent or sequential fashion, in a manner compatible with their licensed use.

Many possibilities exist for the manufacture of the vaccine according to the invention.

Therefore, in a further aspect the invention regards the use of the composition according to the invention, or of the composition as obtainable by the method for the preparation according to the invention, for the manufacture of a vaccine for the protection of fish against infection or disease caused by PRV.

Also, in a further aspect the invention regards a method for the manufacture of a vaccine for the protection of fish against infection or disease caused by PRV, the method comprising the step of
formulating the composition according to the invention, or the composition as obtainable by the method for the preparation according to the invention, into a vaccine.

The formulation of the composition comprising the aziridine-inactivated PRV into a vaccine can be done using well-known methods and equipment. Typically this regards the admixing of further excipients such as a pharmaceutically acceptable carrier as described herein, and optionally stabilisers, preservatives, and/or adjuvants. Preservatives are e.g. thiomersal, phenoxyethanol, formalin, or antibiotics (e.g. gentamycin). Stabilisers are e.g. dextrane, glycerol, gelatine, amino acids, or buffers.

The admixing of an adjuvant may comprise simple mixing of aqueous compositions, e.g. when the adjuvant is an aluminium salt. Alternatively, when the adjuvant is an oily phase, the vaccine can be formulated as an emulsion with the oil adjuvant. The emulsion-vaccine can be prepared using a range of emulsifying equipment which is available for operation at a desired low-, middle- or high shear value, such as: rotor-stator mixers, for example: SILVERSON® (turbine) mixer; ULTRA TURRAX® blender; colloid mill; IKA MagicLab, module UTL or DISPAX-REACTOR®; HEIDOLPH® Silent Crusher M; etc. A variant of high-speed mixing is the SPINPRO™ Reactor (Flowid, Eindhoven, The Netherlands), which is a spinning disk reactor. Equipment for high pressure homogenisation, is: a MICROFLUIDIZER™ processor, an Avestin high pressure homogeniser, a APV RANNIE Mini-lab®- or a APV GAULIN® homogeniser.

General techniques and considerations that apply to the manufacture of vaccines under well-known standards for pharmaceutical production are described for instance in governmental directives and regulations (Pharmacopoeia, 9CFR) and in well-known handbooks ("Veterinary vaccinology" and: "Remington", both supra). Commonly such vaccines are prepared sterile, and are prepared using excipients of pharmaceutical quality grade.

Such preparations will incorporate microbiological tests for sterility, and absence of extraneous agents; and may include studies in vivo or in vitro for confirming efficacy and safety. After completion of the testing for quality, quantity, sterility, safety and efficacy, the vaccine can be released for sale. All these are well known to a skilled person.

The invention will now be further described by the following, non-limiting, examples.

EXAMPLES

Example 1: Materials and Methods

1.1 Amplification of PRV 150 naive Atlantic salmon pre-smolt fish were inoculated to amplify virus in vivo, for antigen preparation and for challenge trials. The inoculum was a Norwegian isolate of PRV, strain V3279, which in turn had been obtained as a sonicate from whole blood of infected Atlantic salmon. The inoculum was 0.1 ml/fish given i.p. The inoculum was prepared on the day of infection, diluted 1:10 in EMEM and kept on ice prior to inoculation. The pre-smolts were then kept in fresh water for 2 weeks at 12° C.

Next the blood from the 150 PRV inoculated fish was collected with disposable syringes, and pooled in heparin coated 2 ml Vacutainers™ (2-4 fish per tube). After heparinisation, the blood was pooled in 50 ml centrifuge tubes and centrifuged at 2000×g for 10 minutes at 4° C. The blood plasma (about 26 ml) was discarded, and the red blood cell pellet was resuspended in 5× the volume (125 ml) of L 15 medium (Sigma) and 50 µg/mL gentamicin.

1.2 Isolation and Purification of PRV Antigen

The pelleted infected erythrocytes were subsequently sonicated on ice to lyse the cells and release the PRV. The equipment used was a digital sonifier, model SPLe (Branson), using 50 ml centrifugation tubes, and approximately 25 ml of sample volume per sonication. The samples were given 8 pulses of 10 seconds at 25 kHz, with 30 second pauses in between. Next the sonicates were centrifuged at 2000×g for 5 minutes at 4° C. to pellet the cell debris and the PRV containing supernatant was collected and stored at 4° C. until use.

The sonicate was then purified as described by James et al., 2016 (supra), by removing impurities through extraction with a resin. In short: CAPTO™ Core 700 resin (GE healthcare) was washed three times with virus dilution buffer (150 mM NaCl, 15 mM $MgCl_2$, 10 mM Tris, at pH 8.2). After the final wash, the beads were topped with an equal volume of virus dilution buffer to create a Capto Core slurry. For isolating the PRV from the sonicated Atlantic salmon red blood cells, a mixture of 20% Capto Core slurry and 80% lysed Atlantic salmon red blood cells was prepared and incubated by turning the tubes end-over-end for 45 minutes at 4° C. The resin beads were then pelleted by centrifugation at 800×g for 10 minutes, at 4° C., and the supernatant was transferred to a fresh tube. After this first Capto Core extraction, 4 more were performed on the same material and in the same way. The selection of 5 rounds of purification in total was a balance between loss of virus and loss of impurities such as cytokines and haemoglobin which may interfere with vaccination.

The presence of PRV was confirmed with RT-qPCR and the purity of the sample was confirmed with SDS-PAGE and a silver stain.

The supernatants from all purifications were pooled, resulting in a combined composition comprising PRV in which the Cq value was 23.23, and the amount of gene copies of Sigma1 was determined to be $1.13 \times 10^5/\mu l$.

1.3 BEI Inactivation

The BEI was prepared from combining equal volumes of 1.09 M BEA and 1.91 M NaOH. This generated a stock-solution of 545 mM BEI.

The purified erythrocyte sonicate, containing the PRV in the virus dilution buffer (see above), was treated with 10 mM BEI at 20° C. for 28 hours while on a magnetic stirrer. After the incubation, any remaining BEI was neutralized with 15 mM Na-thiosulfate at 20° C. for 1 hour while on a magnetic stirrer. Finally, the pH was set to 7.6 using 4N hydrochloric acid.

1.4 UV-Inactivation

The UV inactivation was performed using standard equipment. In short: a total of 40.5 mL PRV in virus dilution buffer (the purified erythrocyte sonicate) was transferred into a reagent reservoir together with 4.5 mL of 500 µM riboflavin (vitamin B2) in 0.9% NaCl. Using a 50 mL syringe, the whole mixture was transferred into an R&D scale ELP bag provided by Terumo™ BCT for UV inactivation, and any trapped air was removed using the same syringe. The solution was inactivated using a MIRASOL® PRT system (Terumo BCT) using the pre-programmed method no.: 150. After the run was completed, the ELP bag was pierced with a 21G needle to aspirate the UV-inactivated PRV sample. The sample was transferred into a 100 mL glass bottle and stored at 4° C. until use.

1.5 Quantitative PCR

Nucleic acid was isolated from the purified PRV samples as follows: 50 µL of the Capto Core purified erythrocyte lysate was added to 150 µL virus dilution buffer. Subsequently, 250 µL lysis buffer from the MagNA Pure LC Total Nucleic Acid Isolation Kit™ (Roche) was added. Total nucleic acids were isolated using a MAGNA PURE™ 96 machine (Roche), using the 'external lysis' program, and using the MAGNA PURE™ 96 DNA and Viral NA Small Volume™ kit (Roche).

Also, one sample with PBS as a negative control was included in the MAGNA PURE™ isolation. A one-step RT-qPCR mastermix was prepared with 17 µL water for injection; 1 µL SUPERSCRIPT™ III RT/Platinum Taq mix (Invitrogen); 25 µL 2×SYBR™ Green reaction mix (Invitrogen); 2 µL primer mix; and 5 µL test sample. The primer mix consisted of 10 µM FWD S1 and 10 µM REV S1 primers:

```
FWD S1 (SEQ ID NO: 1):
5'-TGCGTCCTGCGTATGGCACC-3',

REV S1 (SEQ ID NO: 2):
5'-GGCTGGCATGCCCGAATAGCA-3',
```

The RT-qPCR cycling and measurement was done using a CFX96 Real-Time System C1000™ thermal cycler (Bio-Rad). With each RT-qPCR run a standard consisting of a DNA template of the PRV $S_1$ gene was included, in 10-fold fold dilutions between $4.37 \times 10^6$ and $4.37 \times 10^1$ copy numbers/µL.

The RT-qPCR protocol started with 55.0° C. for 3 minutes for the formation of cDNA; increased to 95.0° C. for 3 minutes for the RT enzyme inactivation. This was the start of the qPCR loop with the denaturation at 92.0° C. for 5 seconds, the annealing and elongation at 58.0° C. for 5 seconds, and the SYBR green measurement at 77° C. for 1 second. This loop was repeated for 39 more times. After the program had finished, a melt curve was performed starting at 73.0° C. and rising to 89.5° C. by steps of 0.3° C. every 5 seconds. During this procedure a SYBR green measurement was done every 5 seconds. The Cq values were determined and the copy numbers were calculated using CFX manager (BioRad)

1.6 Vaccine Formulation

The test vaccines were formulated as water-in-oil emulsions, with light liquid paraffin oil as adjuvant, and contained Polysorbate 80 and sorbitan mono-oleate as emulsifier, using standard procedures. Water:oil volume ratio of the vaccine was 40:60. The waterphases consisted for 95% of the inactivated PRV samples. The negative control vaccine was made using a saline sample.

Example 2: Virus-Inactivation Test

The efficiency of the inactivation by the two methods applied (UV-light exposure and aziridine incubation) was tested in vivo, next to a sample from the same PRV batch that had not been inactivated, as well as a PRV positive control sample.

The samples were each tested in a group of 10 Atlantic salmon pre-smolts, strain Stofnfiskur. The fish were acclimatized for 1 week in 12° C. freshwater. The water was kept at between 65 and 100% oxygen.

Next fish were anaesthetized and inoculated i.p. with 0.1 ml from one of the three samples. All fish were marked per group by fin clipping. All samples were kept on ice until inoculation.

From all groups 5 animals were taken at 3 days post inoculation; plasma samples were obtained, and RT-qPCR of these samples served as baseline for the RT-qPCR from plasma samples taken at 14 days post inoculation.

2.1 Results

No amplification of PRV was detected in any of the fish samples inoculated with BEI-inactivated or with UV-inactivated virus, neither at 3 nor at 14 dpi. All samples from the untreated PRV, and most samples from the positive control group tested positive for PRV at 14 dpi.

It was concluded that both methods of inactivation resulted in complete inactivation of the PRV.

Example 3: Vaccination-Challenge Study

Atlantic salmon parr, strain Stofnfiskur, of 25-35 grams each were used. The population was tested for most of the relevant salmon pathogens, viral and bacterial, including PRV, by RT-qPCR. Only fish that scored negative for prior contamination, and that were apparently intact and healthy were used. The fish were kept in fresh water during acclimatisation and immunisation, and were kept in seawater (salinity 32 promille, 70% oxygen) during challenge. All water was at 12° C. Fish mean weight at start was determined at start of acclimatisation.

Test groups had 26 fish, and the unvaccinated control group had 32 fish. Also 10 fish were used as day zero controls. At challenge, 6 weeks after vaccination, infected shedder fish were added in a ratio of 1:5 to the total number of fish in the experiment.

Fish were marked by transponder tag 2 weeks before the experiment, and were acclimatised in the test tank 5 days before the experiment. Before vaccination, the fish were starved for 48 hrs, and sedated and anesthetized with benzocaine and iso-eugenol. Vaccination was with 0.1 ml, by i.p. injection. Challenge by co-habitation started at 6 weeks p.v., and continued for another 14 weeks.

Blood samples were taken at 4, 6, and 8 weeks post challenge. Tissue samples were taken at 6 and 8 weeks p.c.: heart samples were kept in formalin 4%. Blood was heparinized and centrifuged at 3000×g, for 10 min. at 4° C. Plasma and cells were stored separately at −80° C. until use.

3.1 Histopathological Scoring

Sections of heart muscle for histopathology were processed and stained with haematoxylin and eosin following standard procedures. Individual samples were examined for heart lesions in consistence with HSMI. The grade of changes was scored from 0 to 4 using criteria as described in Table 1.

TABLE 1

Heart lesions scoring of epicard
HSMI-related heart lesion scores - Epicardium

| Score | Description |
|---|---|
| 0 | Normal appearance. |
| 1 | Focal/multifocal (2-4 foci) of inflammatory cells lifting the epicardial layer from the surface of the heart, typically 2-3 cell layers thick |
| 2 | Diffuse infiltration of inflammatory cells (mononuclear) >5 cell layers thick in most of the epicard present. The infiltration of cells is multifocal to diffuse and can involve parts or the entire epicardium available for assessment |
| 3 | Diffuse infiltration of inflammatory cells (mononuclear) >10 cell layers thick in most of the epicard present. Moderate pathological changes consisting of moderate number of inflammatory cells in the epicardium |
| 4 | Diffuse infiltration of inflammatory cells (mononuclear) >15 cell layers thick in most of the epicard present. Severe pathological changes characterised by intense infiltration of inflammatory cells in the epicardium |

3.1 Statistical Analyses

The PRV RT-qPCR results and the histopathology scores were analysed statistically using the Mann Whitney compare ranks test. All statistical analysis described were performed with GraphPad™ Prism (GraphPad Software Inc., USA) and p-values of p≤0.05 were considered as significant.

3.3 Results

Average weight of the fish at marking was 30.8 grams, and at vaccination was 32.9 grams.

TABLE 2 number of fish with heart lesions (in epicard) at 8 weeks post challenge of a certain score level.

| Vaccine group | Number of fish with heart lesion score of: | | | | |
|---|---|---|---|---|---|
| | 0 | 1 | 2 | 3 | 4 |
| 1  Saline | 2 | 0 | 11 | 8 | 3 |
| 2  UV-treated PRV | 3 | 5 | 7 | 8 | 1 |
| 3  BEI-treated PRV | 24 | 0 | 0 | 0 | 0 |

Thus, the percentage of fish with a HSMI specific hart lesions score of 2 or higher, at 8 weeks post challenge, was:
Saline group: 92%
UV-treated PRV: 67%.
BEI-treated PRV: 0%

It was concluded that the challenge experiment was successful, as all non-vaccinated fish became very ill with signs of severe HSMI. The vaccine of UV-inactivated PRV gave hardly any protection. On the contrary, the vaccine of BEI-inactivated PRV gave excellent protection against signs of HSMI from the PRV challenge infection.

Example 4: QPCR Results of Vaccination-Challenge Study

4.1 Quantification of Vaccine Dose

The purified PRV pool from which the vaccines had been prepared for the vaccination-challenge trial as described in Example 3 above, was tested for antigen content using the qPCR assay as described in Example 1.5 above, and showed the amount of gene copies of Sigma1 was $1.13 \times 10^5/\mu l$.

When incorporating the dilution that occurred during vaccine preparation, this means the amount of PRV particles used for the vaccination was $4.6 \times 10^6$ per animal dose.

A further qPCR protocol was employed to test samples of salmon heart tissue that were collected in the trial of Example 3.

4.2 Further qPCR Test

Nucleic acid was isolated using RNAlater™ from conserved salmon heart tip samples as follows: 2×2×2 mm of the sample was added to 600 µL of RLT buffer and total nucleic acids were isolated using the RNeasy® 96 Kit (Qiagen), together with the TissueLyser™ II (Qiagen) for homogenisation of the tissue sample.

A one-step RT-qPCR mastermix (Thermo Scientific VERSO™ 1-Step Q-RT-PCR Kit low ROX) was prepared with 1.85 µL RNAse free water; 0.25 µL Verso enzyme mix; 12.5 µL 2×1-step QPCR low ROX mix and 1.25 µL RT Enhancer. Next 15.85 µL of mastermix were added to 2.25 µL forward primer FWD L1 and 2.25 µL reverse primer REV L1; 0.65 µL TaqMan probe; and 4 µL test sample. The primers and probe (used at 10 µM each) are as follows:

```
FWD L1:
                                     (SEQ ID NO: 3)
    5'-TGCTAACACTCCAGGAGTCATTG-3'

REV L1:
                                     (SEQ ID NO: 4)
    5'-TGA ATCCGCTGCAGATGAGTA-3':

TaqMan probe L1:
                                     (SEQ ID NO: 5)
    5'-6FAM-CGCCGGTAGCTCT-MGBNFQ-3'
```

The RT-qPCR cycling and measurement was done using an ABI PRISM® 7500 FAST Sequence Detection System (Applied Biosystems).

The RT-qPCR protocol started with 50.0° C. for 30 minutes for the formation of cDNA; increased to 95.0° C. for 15 minutes for the RT enzyme inactivation. This was the start of the qPCR loop with the denaturation at 95.0° C. for 15 seconds, and the annealing and elongation at 60.0° C. for 1 min. This loop was repeated for 39 more times. The Cq values were determined in the 7500 FAST™ System Software v1.5.1 (Applied Biosystem) with a threshold value of 0.1 and a baseline from cycle 3 to 15.

4.3 Results of Heart Tip Sample qPCR

To evaluate vaccination-efficacy at 8 w. post challenge the reduction of virus load was tested by qPCR of samples from the tips of the heart ventricles from the salmon. In groups 1 and 2 (mock vaccine and UV-inactivated PRV vaccine, respectively) all samples were found to be positive for PRV. On the contrary, in group 3 (BEI-inactivated PRV vaccine) only 8 of 12 animals were found positive for PRV. In addition the amounts of virus detected in the group 3 samples that were PRV positive, was much reduced as compared to the amounts found in group 1 and 2 samples: the average Cq values in groups 1 and 2 were 22.1 and 22.0 respectively (n=12). Remarkably, for group 3, the average Cq value was 30.6 (n=8). The threshold for negative scores in this experiment was Cq=40.

4.4 Conclusions

The protective efficacy of the vaccine based on BEI-inactivated PRV was surprisingly good: the number of animals having PRV in their blood after challenge was reduced by ⅓ resulting from this vaccination. Also, the viral load in the BEI-PRV vaccinated animals was much reduced.

Such efficacy scores had not previously been observed or reported in literature. Both these results show a strong reduction of PRV replication, indicating significant viral clearance and/or resistance to infection.

The invention claimed is:

1. A composition comprising an inactivated orthoreovirus, that has been inactivated by incubation with an aziridine, wherein the orthoreovirus is piscine orthoreovirus (PRV).

2. The composition of claim 1, wherein the aziridine is ethylenimine.

3. A vaccine for fish against infection or disease caused by piscine orthoreovirus (PRV), comprising the composition of claim 2, and a pharmaceutically acceptable carrier.

4. A method of protecting a fish against infection or disease caused by piscine orthoreovirus (PRV) comprising administering the vaccine of claim 3, to said fish.

5. A vaccine for fish against infection or disease caused by piscine orthoreovirus (PRV), comprising the composition of claim 1 and a pharmaceutically acceptable carrier.

6. The vaccine of claim 5, that comprises an adjuvant.

7. A method of protecting a fish against infection or disease caused by piscine orthoreovirus (PRV) comprising administering the vaccine of claim 6, to said fish.

8. A method of protecting a fish against infection or disease caused by piscine orthoreovirus (PRV) comprising administering the vaccine of claim 5 to said fish.

9. A method of manufacturing a vaccine to protect a fish against infection or disease caused by piscine orthoreovirus (PRV), comprising formulating the composition of claim 1.

10. A vaccine for fish against infection or disease caused by piscine orthoreovirus (PRV), comprising a composition obtainable by the method of claim 1, and a pharmaceutically acceptable carrier.

11. A method of protecting a fish against infection or disease caused by piscine orthoreovirus (PRV), comprising administering the vaccine of claim 10 to said fish.

12. A method of producing a composition comprising aziridine-inactivated piscine orthoreovirus (PRV), comprising the steps of:
   a. obtaining a composition comprising PRV, and
   b. inactivating the PRV in said composition by incubation with an aziridine.

13. The method of claim 12, wherein the aziridine is ethylenimine or binary ethylenimine.

14. A method of manufacturing a vaccine to protect a fish against infection or disease caused by piscine orthoreovirus (PRV), comprising formulating the composition obtainable by the method of claim 13 into a vaccine.

15. A vaccine for fish against infection or disease caused by piscine orthoreovirus (PRV), comprising a composition obtainable by the method of claim 13, and a pharmaceutically acceptable carrier.

16. A method of manufacturing a vaccine to protect a fish against infection or disease caused by piscine orthoreovirus (PRV), comprising formulating the composition obtainable by the method of claim 12 into a vaccine.

17. A vaccine for fish against infection or disease caused by piscine orthoreovirus (PRV), comprising a composition obtainable by the method of claim 12, and a pharmaceutically acceptable carrier.

* * * * *

SEQUENCE LISTING

```
<160> NUMBER OF SEQ ID NOS: 5

<210> SEQ ID NO 1
<211> LENGTH: 20
<212> TYPE: DNA
<213> ORGANISM: Artificial Sequence
<220> FEATURE:
<223> OTHER INFORMATION: RT-qPCR primer: FWD S1

<400> SEQUENCE: 1
tgcgtcctgc gtatggcacc                                                   20

<210> SEQ ID NO 2
<211> LENGTH: 21
<212> TYPE: DNA
<213> ORGANISM: Artificial Sequence
<220> FEATURE:
<223> OTHER INFORMATION: RT-qPCR primer: REV S1

<400> SEQUENCE: 2
ggctggcatg cccgaatagc a                                                 21

<210> SEQ ID NO 3
<211> LENGTH: 23
<212> TYPE: DNA
<213> ORGANISM: Artificial Sequence
<220> FEATURE:
<223> OTHER INFORMATION: RT-qPCR primer: FWD L1

<400> SEQUENCE: 3
tgctaacact ccaggagtca ttg                                               23

<210> SEQ ID NO 4
<211> LENGTH: 21
<212> TYPE: DNA
<213> ORGANISM: Artificial Sequence
<220> FEATURE:
<223> OTHER INFORMATION: RT-qPCR primer: REV L1

<400> SEQUENCE: 4
tgaatccgct gcagatgagt a                                                 21

<210> SEQ ID NO 5
<211> LENGTH: 13
<212> TYPE: DNA
<213> ORGANISM: Artificial Sequence
<220> FEATURE:
<223> OTHER INFORMATION: TaqMan probe L1

<400> SEQUENCE: 5
cgccggtagc tct                                                          13
```